US010411953B2

United States Patent
Hong et al.

(10) Patent No.: US 10,411,953 B2
(45) Date of Patent: Sep. 10, 2019

(54) VIRTUAL MACHINE FAULT TOLERANCE METHOD, APPARATUS, AND SYSTEM

(71) Applicant: Huawei Technologies Co., Ltd., Shenzhen (CN)

(72) Inventors: Tao Hong, Hangzhou (CN); Xiaowei Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 169 days.

(21) Appl. No.: 15/657,621

(22) Filed: Jul. 24, 2017

(65) Prior Publication Data

US 2017/0324609 A1    Nov. 9, 2017

Related U.S. Application Data

(63) Continuation of application No. PCT/CN2015/082855, filed on Jun. 30, 2015.

(30) Foreign Application Priority Data

Jan. 23, 2015  (CN) .......................... 2015 1 0035435

(51) Int. Cl.
*H04L 12/24*  (2006.01)
*G06F 11/07*  (2006.01)
(Continued)

(52) U.S. Cl.
CPC ...... *H04L 41/0695* (2013.01); *G06F 9/45558* (2013.01); *G06F 11/07* (2013.01);
(Continued)

(58) Field of Classification Search
None
See application file for complete search history.

(56) References Cited

U.S. PATENT DOCUMENTS 6,625,751 B1 * 9/2003 Starovic .............. G06F 11/1484
714/11
2007/0283195 A1 * 12/2007 Reinhardt .......... G06F 11/1484
714/710
(Continued)

FOREIGN PATENT DOCUMENTS

CN    103501290 A    1/2014
CN    103581177 A    2/2014
(Continued)

OTHER PUBLICATIONS

Machine Translation and Abstract of Chinese Publication No. CN103501290, Jan. 8, 2014, 5 pages.
(Continued)

*Primary Examiner* — Philip J Chea
*Assistant Examiner* — Hassan A Khan
(74) *Attorney, Agent, or Firm* — Conley Rose, P.C.

(57) ABSTRACT

A virtual machine fault tolerance method, including receiving a network request, and separately sending the network request to a primary virtual machine and a secondary virtual machine, receiving a network response data packet, where the network response data packet is a primary-end data packet transmitted by the primary virtual machine or a secondary-end data packet transmitted by the secondary virtual machine, comparing data of the received network response data packet with the peer-end data according to data byte order when peer-end data is stored, and generating and sending a newly created data packet to the client when the compared data is the same, where the newly created data packet includes the compared data. Hence, network performance and computing performance of the primary virtual machine can be improved without modifying network protocol stacks of the primary virtual machine and the secondary virtual machine.

16 Claims, 11 Drawing Sheets

(51) Int. Cl.
*G06F 9/455* (2018.01)
*G06F 11/14* (2006.01)

(52) U.S. Cl.
CPC ...... *G06F 11/1435* (2013.01); *G06F 11/1484* (2013.01); *H04L 41/0654* (2013.01); *G06F 2009/45591* (2013.01); *G06F 2009/45595* (2013.01); *H04L 41/0856* (2013.01)

(56) References Cited

U.S. PATENT DOCUMENTS

| | | | |
|---|---|---|---|
| 2009/0106328 A1* | 4/2009 | Callaway | G06F 11/1641 |
| 2009/0119538 A1* | 5/2009 | Scales | G06F 11/14 714/6.13 |
| 2010/0318991 A1* | 12/2010 | Venkitachalam | G06F 9/45533 718/1 |
| 2013/0283092 A1 | 10/2013 | Das et al. | |
| 2016/0323427 A1* | 11/2016 | Guan | H04L 67/1002 |
| 2017/0300347 A1* | 10/2017 | Tian | G06F 9/45558 |

FOREIGN PATENT DOCUMENTS

| | | | |
|---|---|---|---|
| CN | 103761166 A | 4/2014 | |
| CN | 104239120 A | 12/2014 | |
| CN | 104618155 A | 5/2015 | |

OTHER PUBLICATIONS

Machine Translation and Abstract of Chinese Publication No. CN103581177, Feb. 12, 2014, 22 pages.
Machine Translation and Abstract of Chinese Publication No. CN104239120, Dec. 24, 2014, 41 pages.
Machine Translation and Abstract of Chinese Publication No. CN104618155, May 13, 2015, 23 pages.
Foreign Communication From a Counterpart Application, Chinese Application No. 201510035435.4, Chinese Office Action dated Jul. 19, 2017, 6 pages.
Foreign Communication From a Counterpart Application, PCT Application No. PCT/CN2015/082855, English Translation of International Search Report dated Oct. 21, 2015, 2 pages.
Foreign Communication From a Counterpart Application, PCT Application No. PCT/CN2015/082855, English Translation of Written Opinion dated Oct. 21, 2015, 8 pages.
"Contribution for discussion—Requirements for reliability:" XP014200228, ETSI, NFV-INFOO1v033, Nov. 30, 2013, 8 pages.
Zhichun L., et al.,"Measurement and diagnosis of address Misconfigured P2P traffic," XP011324625, IEEE Network, vol. 25, No. 3, May 31, 2011, pp. 22-28.
Foreign Communication From a Counterpart Application, European Application No. 15878503.0, Extended European Search Report dated Nov. 7, 2017, 10 pages.

* cited by examiner

FIG. 4

VIRTUAL MACHINE FAULT TOLERANCE METHOD, APPARATUS, AND SYSTEM

CROSS-REFERENCE TO RELATED APPLICATIONS

This application is a continuation of International Patent Application No. PCT/CN2015/082855 filed on Jun. 30, 2015, which claims priority to Chinese Patent Application No. 201510035435.4 filed on Jan. 23, 2015. The disclosures of the aforementioned applications are hereby incorporated by reference in their entireties.

TECHNICAL FIELD

The present disclosure relates to the field of virtual machine technologies, and in particular, to a virtual machine fault tolerance method, apparatus, and system.

BACKGROUND

Virtual machine fault tolerance is a key technology in the virtualization field, and its purpose is to switch a service to a secondary virtual machine when a primary virtual machine is shut down because of a hardware fault in order to ensure key-service zero outage and zero data loss.

Currently, a fault tolerance method based on virtual machine status synchronization is usually used. In this fault tolerance method, a status of a primary virtual machine is synchronized at intervals to a secondary virtual machine in order to keep status synchronization between the primary virtual machine and the secondary virtual machine. In the fault tolerance method, externally-presented data consistency of a primary-end host and a secondary-end host needs to be ensured. Therefore, a network data output packet of the primary virtual machine needs to be buffered first. After status synchronization between the primary virtual machine and the secondary virtual machine is completed, the buffered network data output packet is released from the primary-end host. Therefore, higher synchronization frequency indicates better network performance. However, on one hand, time overheads for synchronizing statuses of the primary virtual machine and the secondary virtual machine define an upper limit of frequency of synchronizing a virtual machine status. On the other hand, the primary virtual machine needs to be frequently paused and resumed when the virtual machine status is frequently synchronized, and this leads to a substantial decline in computing performance of the primary virtual machine.

Currently, to resolve a conflict between improvement of network performance and improvement of computing performance in the fault tolerance method based on virtual machine status synchronization, INTEL Corporation has proposed a virtual machine fault tolerance method based on coarse-grain lock-stepping (COLO). In this method, by comparing network responses, to a same network request, from the primary virtual machine and the secondary virtual machine, whether to synchronize statuses of the primary virtual machine and the secondary virtual machine is determined. When response data packets of a primary network and a secondary network are the same, a network data output packet of the primary-end host is released immediately, or the statuses of the primary virtual machine and the secondary virtual machine are synchronized immediately when response data packets of a primary network and a secondary network are different. In this manner, the primary-end host can release the network data output packet in a timely manner, and obtain better network performance. In addition, when output of the primary network and output of the secondary network are the same, intervals for synchronizing the statuses of the primary virtual machine and the secondary virtual machine may be prolonged, and this reduces impact on computing performance of the virtual machine.

However, in the virtual machine fault tolerance method based on COLO, a network response data packet is used as a basic unit for comparison. To make network response data packets output by the primary virtual machine and the secondary virtual machine consistent as far as possible, network protocol stacks in kernels of the primary virtual machine and the secondary virtual machine need to be modified. In this way, network performance and computing performance of a virtual machine whose kernel cannot be modified cannot be improved.

SUMMARY

Embodiments of the present disclosure provide a virtual machine fault tolerance method such that network performance and computing performance of a virtual machine can be improved without modifying a kernel of the virtual machine. The embodiments of the present disclosure further provide a corresponding apparatus and system.

A first aspect of the present disclosure provides a virtual machine fault tolerance method, where the method is applied to a virtual machine fault tolerance apparatus of a primary-end host in a virtual machine fault tolerance system, the virtual machine fault tolerance system further includes a secondary-end host, a primary virtual machine runs on the primary-end host, a secondary virtual machine runs on the secondary-end host, and the method includes receiving a network request sent by a client, and separately sending the network request to the primary virtual machine and the secondary virtual machine such that the primary virtual machine and the secondary virtual machine separately respond to the network request, and generate primary-end data and secondary-end data corresponding to the network request, receiving a network response data packet, where the network response data packet is a primary-end data packet transmitted by the primary virtual machine or a secondary-end data packet transmitted by the secondary virtual machine, the primary-end data packet includes a part or all of the primary-end data, and the secondary-end data packet includes a part or all of the secondary-end data, comparing data of the received network response data packet with the peer-end data according to data byte order when peer-end data of the network response data packet is stored, where when the network response data packet is the primary-end data packet, the peer-end data is the secondary-end data, or when the network response data packet is the secondary-end data packet, the peer-end data is the primary-end data, and generating and sending a newly created data packet to the client when the compared data is the same, where the newly created data packet includes the compared data.

With reference to the first aspect, in a first possible implementation manner, comparing data of the network response data packet with the peer-end data according to data byte order includes determining, according to the data byte order, to-be-compared data from data whose byte count is larger when a byte count of the data of the network response data packet is different from a byte count of the peer-end data, where the to-be-compared data is data that has a specified byte count and that is in the data whose byte count is larger, and the specified byte count is the same as a byte count of data whose byte count is smaller, and comparing the data whose byte count is smaller with the to-be-compared data according to the data byte order.

With reference to the first aspect or the first possible implementation manner of the first aspect, in a second possible implementation manner, generating and sending a newly created data packet to the client, where the newly created data packet includes the compared data includes marking the compared data using a sequence number (seq num) of the primary-end data, to generate a newly created data packet, and sending the newly created data packet to the client.

With reference to the first aspect or the first or the second possible implementation manner of the first aspect, in a third possible implementation manner, the method further includes placing the data of the network response data packet following the local-end data according to the byte order to obtain combination data when local-end data of the network response data packet is stored, where when the network response data packet is the primary-end data packet, the local-end data is the primary-end data, or when the network response data packet is the secondary-end data packet, the local-end data is the secondary-end data, and comparing data of the new network response data packet with the combination data according to the data byte order when a new network response data packet is received, and the combination data is peer-end data of the new network response data packet.

A second aspect of the present disclosure provides a virtual machine fault tolerance apparatus, where the apparatus is applied to a primary-end host in a virtual machine fault tolerance system, the virtual machine fault tolerance system further includes a secondary-end host, a primary virtual machine runs on the primary-end host, a secondary virtual machine runs on the secondary-end host, and the apparatus includes a receiving module configured to receive a network request sent by a client, a sending module configured to separately send the network request received by the receiving module to the primary virtual machine and the secondary virtual machine such that the primary virtual machine and the secondary virtual machine separately respond to the network request, and generate primary-end data and secondary-end data corresponding to the network request, where the receiving module is further configured to receive a network response data packet, where the network response data packet is a primary-end data packet transmitted by the primary virtual machine or a secondary-end data packet transmitted by the secondary virtual machine, the primary-end data packet includes a part or all of the primary-end data, and the secondary-end data packet includes a part or all of the secondary-end data, a comparison module configured to compare data of the network response data packet with the peer-end data according to data byte order when peer-end data of the network response data packet is stored, where when the network response data packet is the primary-end data packet, the peer-end data is the secondary-end data, or when the network response data packet is the secondary-end data packet, the peer-end data is the primary-end data, and a generation module configured to generate a newly created data packet when the comparison module determines by means of comparison that the compared data is the same, where the newly created data packet includes the compared data, where the sending module is further configured to send the newly created data packet generated by the generation module to the client.

With reference to the second aspect, in a first possible implementation manner, the comparison module includes a determining submodule configured to determine, according to the data byte order, to-be-compared data from data whose byte count is larger when a byte count of the data of the network response data packet is different from a byte count of the peer-end data, where the to-be-compared data is data that has a specified byte count and that is in the data whose byte count is larger, and the specified byte count is the same as a byte count of data whose byte count is smaller, and a comparison submodule configured to compare the data whose byte count is smaller with the to-be-compared data according to the data byte order, where the to-be-compared data is determined by the determining submodule.

With reference to the second aspect or the first possible implementation manner of the second aspect, in a second possible implementation manner, the generation module is further configured to mark the compared data using a seq num of the primary-end data to generate a newly created data packet, and the sending module is further configured to send the newly created data packet generated by the generation module to the client.

With reference to the second aspect or the first or the second possible implementation manner of the second aspect, in a third possible implementation manner, the apparatus further includes a placement module, where the placement module is configured to place the data of the network response data packet received by the receiving module, following the local-end data according to the byte order to obtain combination data when local-end data of the network response data packet is stored, where when the network response data packet is the primary-end data packet, the local-end data is the primary-end data, or when the network response data packet is the secondary-end data packet, the local-end data is the secondary-end data. The receiving module is further configured to receive a new network response data packet, and the comparison module is further configured to compare data of the new network response data packet with the combination data according to the data byte order when the receiving module receives the new network response data packet, and the combination data obtained by the placement module is peer-end data of the new network response data packet.

A third aspect of the present disclosure provides a primary-end host, where the primary-end host is applied to a virtual machine fault tolerance system, the virtual machine fault tolerance system further includes a secondary-end host, a primary virtual machine runs on the primary-end host, and secondary virtual machine runs on the secondary-end host, and the primary-end host includes the virtual machine fault tolerance apparatus according to the second aspect or the first or the second or the third possible implementation manner of the second aspect.

A fourth aspect of the present disclosure provides a primary-end host, where the primary-end host is applied to a virtual machine fault tolerance system, the virtual machine fault tolerance system further includes a secondary-end host, a primary virtual machine runs on the primary-end host, a secondary virtual machine runs on the secondary-end host, and the primary-end host includes a processor, a storage, and an input/output (I/O) device. The I/O device is configured to receive a network request sent by a client. The processor is configured to separately execute functions of the primary virtual machine and the secondary virtual machine so as to respond to the network request, generate primary-end data and secondary-end data corresponding to the network request, and separately encapsulate the primary-end data and the secondary-end data into at least one network response data packet, where the network response data packet is a primary-end data packet or a secondary-end data packet, the primary-end data packet includes a part or all of the primary-end data, and the secondary-end data packet includes a part or all of the secondary-end data, compare data of the network response data packet with the peer-end data according to data byte order when peer-end data of the network response data packet is stored, where when the network response data packet is the primary-end data packet, the peer-end data is the secondary-end data, or the peer-end data is the primary-end data when the network response data packet is the secondary-end data packet, and generate a newly created data packet when the compared data is the same, where the newly created data packet includes the compared data, and the I/O device is further configured to send the newly created data packet to the client.

A fifth aspect of the present disclosure provides a virtual machine fault tolerance system, including a primary-end host and a secondary-end host, a primary virtual machine runs on the primary-end host, a secondary virtual machine runs on the secondary-end host, and the primary-end host is the primary-end host in the third aspect or the fourth aspect.

The virtual machine fault tolerance method used in the embodiments of the present disclosure is applied to a virtual machine fault tolerance apparatus of a primary-end host in a virtual machine fault tolerance system. The virtual machine fault tolerance system further includes a secondary-end host, a primary virtual machine runs on the primary-end host, and a secondary virtual machine runs on the secondary-end host. The method includes receiving a network request sent by a client, and separately sending the network request to the primary virtual machine and the secondary virtual machine such that the primary virtual machine and the secondary virtual machine separately respond to the network request, and generate primary-end data and secondary-end data corresponding to the network request, receiving a network response data packet, where the network response data packet is a primary-end data packet transmitted by the primary virtual machine or a secondary-end data packet transmitted by the secondary virtual machine, the primary-end data packet includes a part or all of the primary-end data, and the secondary-end data packet includes a part or all of the secondary-end data, comparing data of the network response data packet with the peer-end data according to data byte order when peer-end data of the network response data packet is stored, where when the network response data packet is the primary-end data packet, the peer-end data is the secondary-end data, or the peer-end data is the primary-end data when the network response data packet is the secondary-end data packet, and generating and sending a newly created data packet to the client when the compared data is the same, where the newly created data packet includes the compared data. In other approaches to make byte lengths of network response data packets output by a primary virtual machine and a secondary virtual machine consistent as far as possible, network protocol stacks in kernels of the primary and secondary virtual machines need to be modified. In this way, network performance and computing performance of a virtual machine whose kernel cannot be modified cannot be improved. By comparison, in the virtual machine fault tolerance method provided in the embodiments of the present disclosure, primary-end data can be compared with secondary-end data according to byte order without modifying the network protocol stacks of the primary and secondary virtual machines. Lengths of data packets output by the primary and secondary virtual machines do not need to be consistent, and a newly created data packet can be sent to a client provided that compared data is the same. Therefore, network performance of the primary virtual machine is improved. In addition, when the compared data is the same, a network status of the primary virtual machine does not need to be synchronized to the secondary virtual machine. Therefore, the primary virtual machine does not need to be paused, and computing performance of the primary virtual machine is improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

FIG. 4 is a schematic diagram of another embodiment of a virtual machine fault tolerance method according to the present disclosure;

DESCRIPTION OF EMBODIMENTS

Embodiments of the present disclosure provide a virtual machine fault tolerance method such that network performance and computing performance of a virtual machine can be improved without modifying a kernel of the virtual machine. The embodiments of the present disclosure further provide a corresponding apparatus and system. Details are separately illustrated in the following.

To make persons skilled in the art understand the technical solutions in the present disclosure better, the following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
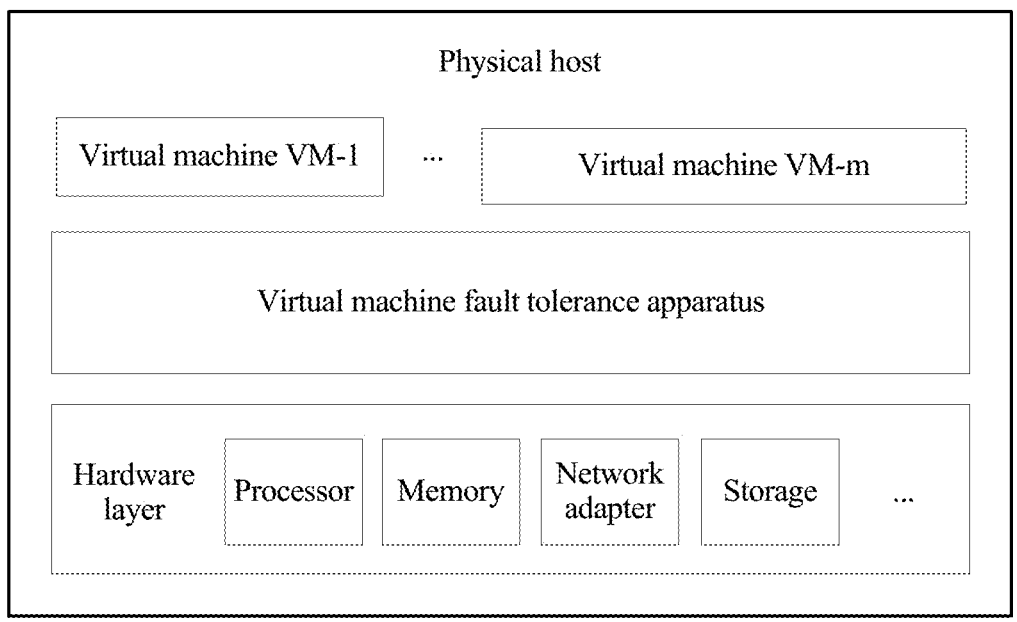
FIG. 1 is a schematic diagram of an embodiment of a physical host according to the present disclosure.

FIG. 1 is a schematic diagram of an embodiment of a physical host according to the present disclosure. For ease of understanding the embodiments of the present disclosure, terms that may be used for describing the embodiments of the present disclosure are described herein first.

Virtual machine:

Using virtual machine software, one or more virtual computers can be simulated on one physical host. These virtual machines can work like real computers, operating systems and application programs can be installed on the virtual machines, and the virtual machines can further visit network resources. As shown in FIG. 1, the physical host may contain virtual machines VM-1 to VM-m, where m is a positive integer, and 1≤m. For application programs running on the virtual machines, the virtual machines work like real computers.

The physical host may be used as a primary-end host, or may be used as a secondary-end host. A primary virtual machine is a virtual machine that runs on the primary-end host and participates in computing when hardware of the primary-end host is normal. A secondary virtual machine is a virtual machine that runs on the secondary-end host and takes over computing work of the primary virtual machine when an exception occurs on hardware of the primary-end host.

Hardware layer:

It is a hardware platform on which a virtualized environment runs. The hardware layer may include multiple types of hardware. For example, a hardware layer of a computing node may include a processor (for example, a central processing unit (CPU)) and a memory, and may further include a network adapter, a high-speed or low-speed I/O device such as a storage, and another device that has a specific processing function, for example, an I/O memory management unit (IOMMU).

Virtual machine fault tolerance apparatus is configured to determine whether primary-end data generated when the primary virtual machine responds to a network request and secondary-end data generated when the secondary virtual machine responds to the network request are consistent, and output a newly created data packet to a client when they are consistent, where the newly created data packet includes compared data in order to improve network performance of the primary-end host, or synchronize status information of the primary virtual machine to the secondary virtual machine when they are inconsistent. The primary virtual machine does not need to synchronize status information to the secondary virtual machine each time the primary virtual machine performs computation, otherwise, the primary virtual machine needs to be paused frequently. Therefore, computing performance of the primary virtual machine is improved.

The virtual machine fault tolerance apparatus in the embodiments of the present disclosure may be a virtual machine monitor (VMM) or a host, or a part of a VMM or a host.

In addition, it may be understood that a virtual machine fault tolerance system provided in the embodiments of the present disclosure is a virtual machine fault tolerance system deployed on a server cluster or a standalone server. For example, in a desktop cloud scenario, the client is a user terminal side and interacts with the virtual machine fault tolerance system deployed on the server.

Figure 2:
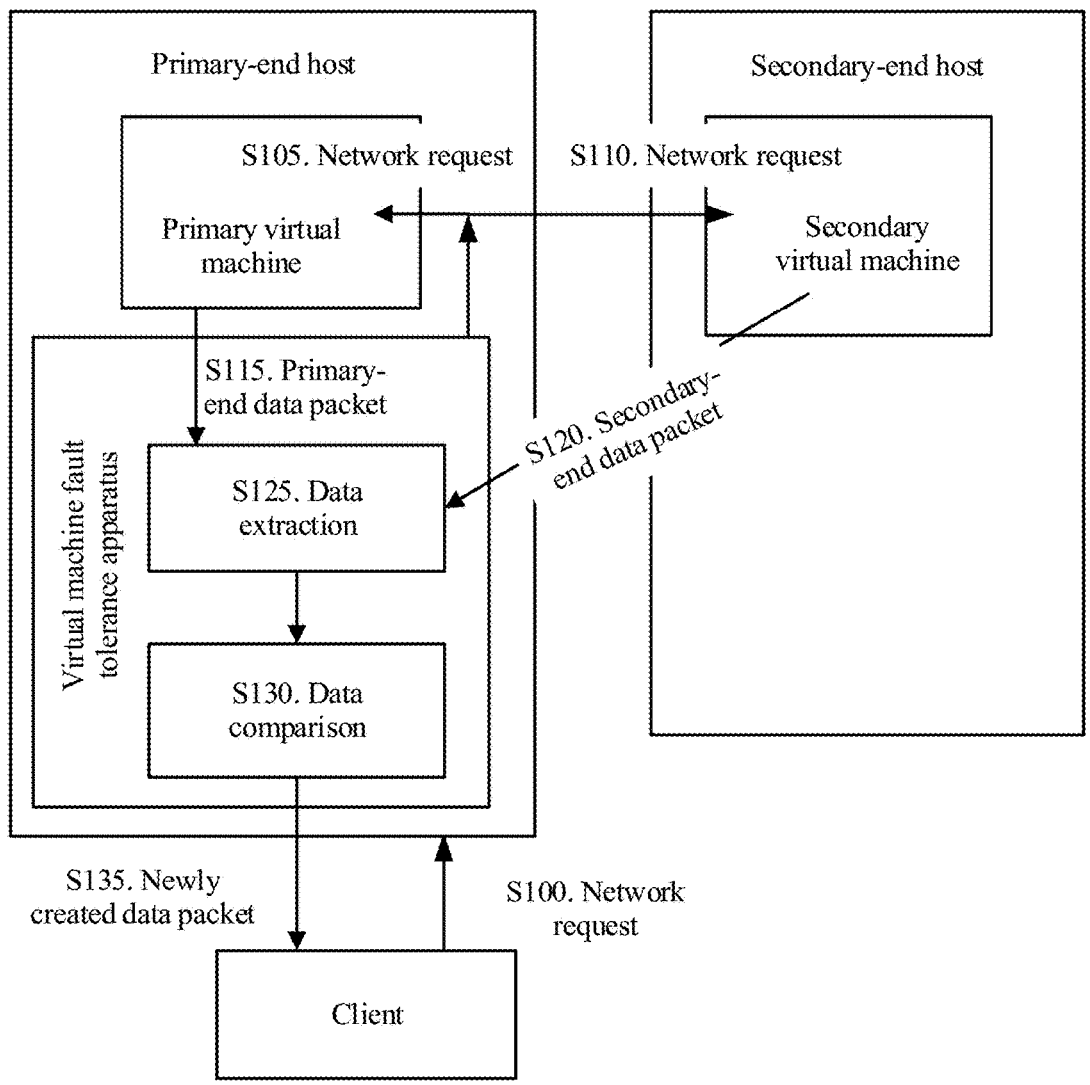
FIG. 2 is a schematic diagram of an embodiment of a virtual machine fault tolerance method according to the present disclosure.

FIG. 2 is a schematic diagram of an embodiment of a virtual machine fault tolerance method according to the present disclosure. As shown in FIG. 2, the virtual machine fault tolerance method provided in this embodiment of the present disclosure is applied to a virtual machine fault tolerance apparatus of a primary-end host in a virtual machine fault tolerance system, the virtual machine fault tolerance system further includes a secondary-end host, a primary virtual machine runs on the primary-end host, a secondary virtual machine runs on the secondary-end host, and the method includes the following steps.

Step S100: The virtual machine fault tolerance apparatus receives a network request sent by a client.

The virtual machine fault tolerance apparatus in this embodiment of the present disclosure may be a VMM or a host, or a part of a VMM or a host.

Step S105: The virtual machine fault tolerance apparatus sends the network request to the primary virtual machine.

Step S110: The virtual machine fault tolerance apparatus sends the network request to the secondary virtual machine such that the primary virtual machine and the secondary virtual machine separately respond to the network request, and generate primary-end data and secondary-end data corresponding to the network request.

Step S115: The virtual machine fault tolerance apparatus receives a primary-end data packet transmitted by the primary virtual machine.

Step S120. The virtual machine fault tolerance apparatus receives a secondary-end data packet transmitted by the secondary virtual machine.

Because of a transmission delay, the primary-end data packet and the secondary-end data packet cannot arrive at the same time. In addition, byte lengths of data in a data packet that arrives each time may be different. Therefore, the virtual machine fault tolerance apparatus may store some primary-end data or secondary-end data, but cannot store the primary-end data and the secondary-end data at the same time.

Each byte of data in each data packet has a seq num, and seq nums are consecutive. Therefore, even if primary-end data or secondary-end data that responds to a same network request may not be in a same primary-end data packet or a same secondary-end data packet, the primary-end data or the secondary-end data may be connected using seq nums.

When the virtual machine fault tolerance apparatus stores the primary-end data, and a primary-end data packet arrives, data in the primary-end data packet that arrives is placed following the stored primary-end data according to order of a seq num. When the virtual machine fault tolerance apparatus stores the secondary-end data, and a primary-end data packet arrives, step S125 is performed.

Step S125: When a byte count of data of a network response data packet is different from a byte count of the peer-end data, the virtual machine fault tolerance apparatus determines, according to data byte order, to-be-compared data from data whose byte count is larger, where the to-be-compared data is data that has a specified byte count and that is in the data whose byte count is larger, and the specified byte count is the same as a byte count of data whose byte count is smaller.

Step S130: Compare the data whose byte count is smaller with the to-be-compared data according to the data byte order.

In this embodiment of the present disclosure, the byte order is order of seq nums of all bytes of data, and the seq nums are consecutive in ascending order or descending order. The comparison begins with the first byte.

Step S135: When the compared data is the same, generate and send a newly created data packet to the client, where the newly created data packet includes the compared data.

For ease of understanding, a service flow of the Transmission Control Protocol (TCP) is used as an example to describe a specific implementation process.

Figure 3:
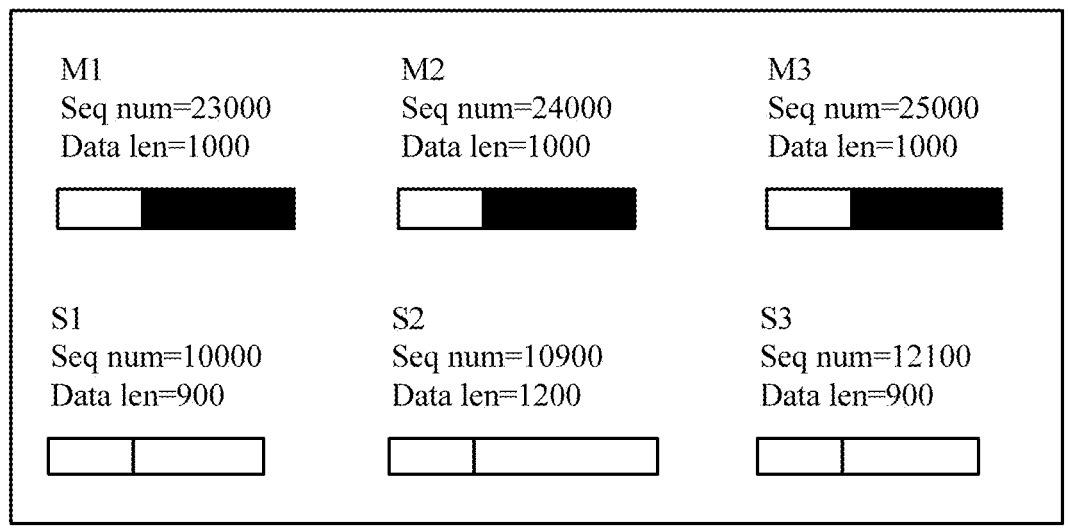
FIG. 3 is a schematic diagram of another embodiment of a virtual machine fault tolerance method according to the present disclosure.

In the TCP, a seq num in a TCP header is used to identify data sending order. For a same request, the primary virtual machine and the secondary virtual machine may return possibly different initial seq num values. Therefore, when the first packet is being received at the beginning, an initial seq num value of the first packet needs to be recorded. As shown in FIG. 3, an initial seq num value of the primary-end is 23000, and an initial seq num value of the secondary-end is 10000. The primary-end has three data packets M1, M2, and M3, and their data lengths (designated as Data len) are 1000 bytes. Further, M1 seq num is 23000, M2 seq num is 24000, and M3 seq num is 25000. The three data packets respectively represent three data packets sent by the primary virtual machine in order. The secondary-end has three data packets S1, S2, and S3, and their data lengths are respectively 900 bytes, 1200 bytes, and 900 bytes, respectively. Further, S1 seq num is 10000, S2 seq num is 10900, and S3 seq num is 12100. The three data packets respectively represent three data packets sent by the secondary virtual machine in order.

Figure 4:
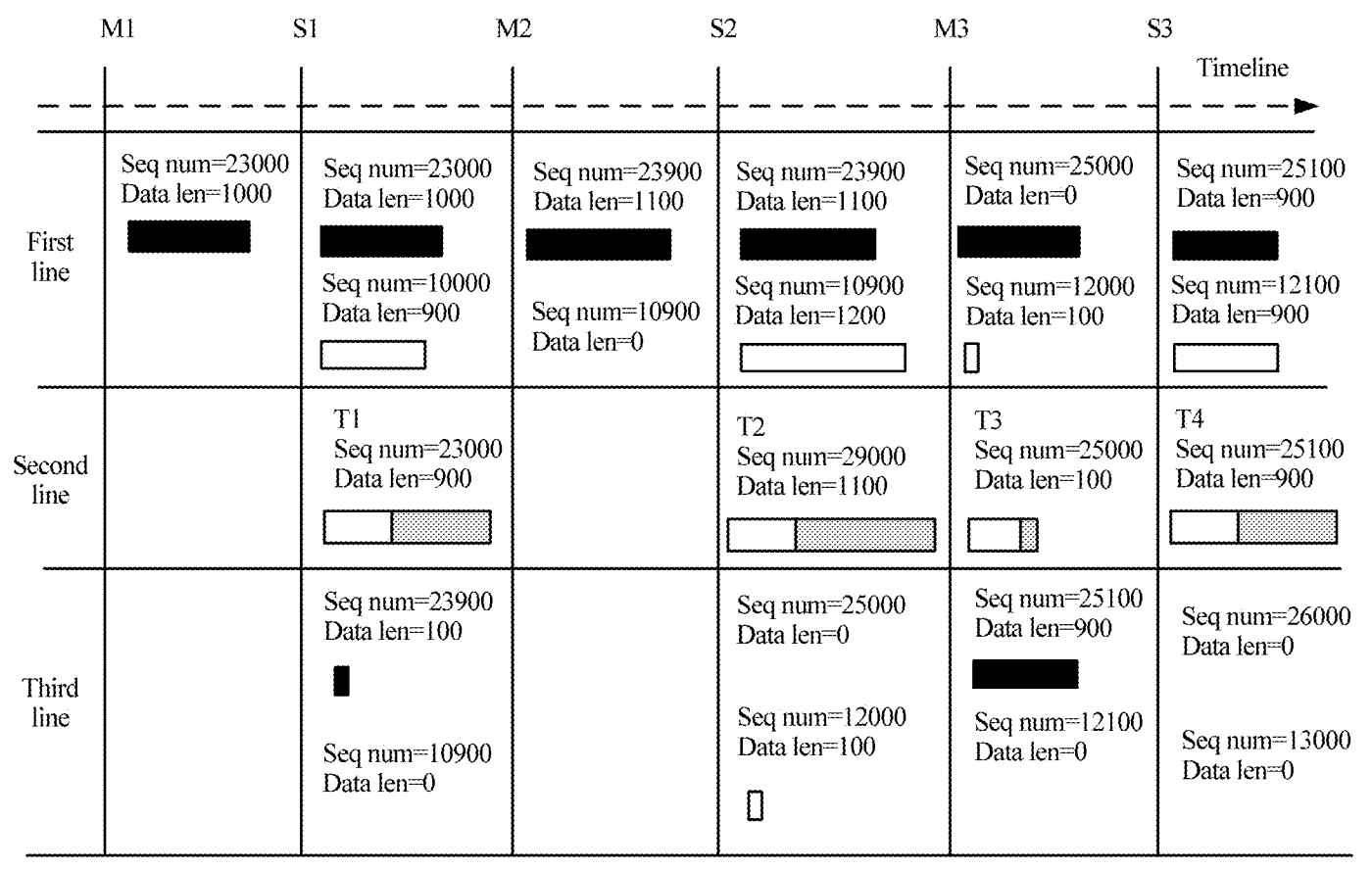

FIG. 4 is a schematic diagram of arrival order of the six data packets on the virtual machine fault tolerance apparatus and their extraction and comparison process.

M1, M2, M3, S1, S2, and S3 arrive at the virtual machine fault tolerance apparatus successively according to timeline order.

The first line indicates data that is not compared after the data packets arrive. The second line indicates that data of a same byte length is extracted from the primary-end data and the secondary-end data to form a newly created data packet that is sent to the client. The third line indicates remaining primary-end data or secondary-end data.

The virtual machine fault tolerance method in which M1, M2, M3, S1, S2, and S3 arrive successively according to the timeline order may include the following steps.

S200. When M1 arrives, the secondary-end does not have a data packet. Therefore, data in M1 is extracted and put into a primary-end data cache.

S205. When S1 arrives, extract data in S1. Then, check the primary-end data cache and find 900-byte data. Extract the 900-byte data from the primary-end data cache and compare the data with the data in S1. When the data is the same, create a new data packet T1 based on a seq num of the primary-end, and send the new data packet to the client. Finally, the primary-end data cache still has 100-byte data left.

Step S210: When M2 arrives, extract 1000-byte data from M2. Because a secondary-end data cache does not have data, the data is put into the primary-end data cache in order.

Step S215: When S2 arrives, extract 1200-byte data from S2. Check data of the primary-end data cache and find that only 1100-byte data exists. Extract the 1100-byte data from the primary-end data cache and compare the data with the first 1100-byte data in S2. Create a new data packet T2 based on the seq num of the primary-end and send the new data packet to the client. Finally, the last 100-byte data in S2 is put into the secondary-end data cache.

Step S220: When M3 arrives, extract 1000-byte data from M3. Check and find that 100-byte data exists in the secondary-end data cache. Extract the 100-byte data from the secondary-end data cache and compare the data with the first 100-byte data in M3. Create a new data packet T3 based on the seq num of the primary-end and send the new data packet to the client. Finally, remaining 900-byte data in M3 is put into the primary-end data cache.

Step S225: When S3 arrives, extract 900-byte data from S3. Check and find that 900-byte data exists in the primary-end data cache. Extract the 900-byte data from the primary-end data cache and compare the data with the 900-byte data in S3. Create a new data packet based on the seq num of the primary-end and send the new data packet T4 to the client.

It can be learned that, in other approaches, to make byte lengths of network response data packets output by a primary virtual machine and a secondary virtual machine consistent as far as possible, network protocol stacks in kernels of the primary and secondary virtual machines need to be modified. In this way, network performance and computing performance of a virtual machine whose kernel cannot be modified cannot be improved. By comparison, in the virtual machine fault tolerance method provided in this embodiment of the present disclosure, primary-end data can be compared with secondary-end data according to byte order without modifying the network protocol stacks of the primary and secondary virtual machines. Lengths of data packets output by the primary and secondary virtual machines do not need to be consistent, and a newly created data packet can be sent to a client provided that compared data is the same. Therefore, network performance of the primary virtual machine is improved. In addition, when the compared data is the same, a network status of the primary virtual machine does not need to be synchronized to the secondary virtual machine. Therefore, the primary virtual machine does not need to be paused, and computing performance of the primary virtual machine is improved.

Figure 5:
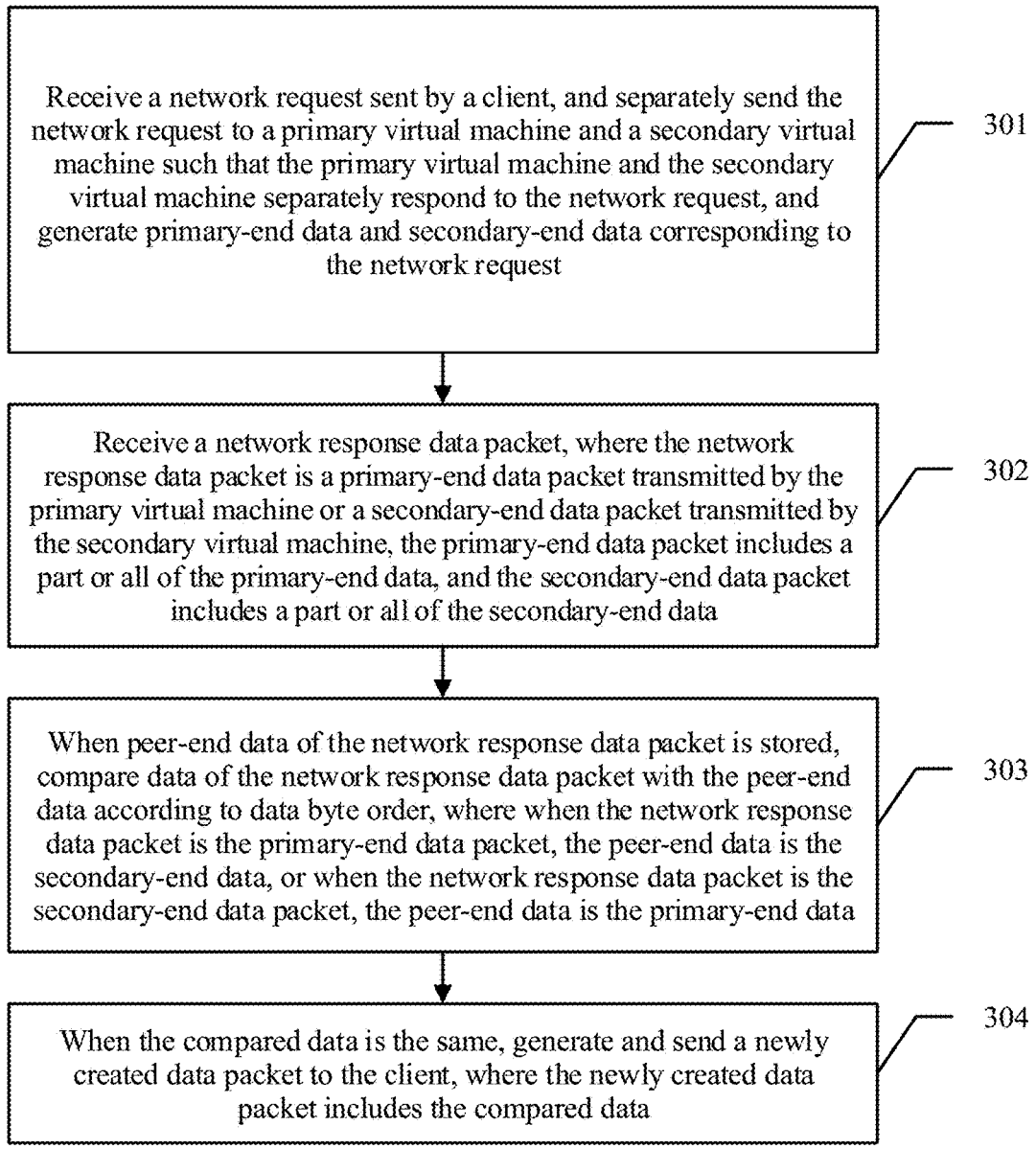
FIG. 5 is a flowchart diagram of another embodiment of a virtual machine fault tolerance method according to the present disclosure.

Referring to FIG. 5, an embodiment of a virtual machine fault tolerance method according to the present disclosure includes the following steps.

Step 301: Receive a network request sent by a client, and separately send the network request to a primary virtual machine and a secondary virtual machine such that the primary virtual machine and the secondary virtual machine separately respond to the network request, and generate primary-end data and secondary-end data corresponding to the network request.

The virtual machine fault tolerance method provided in this embodiment of the present disclosure is applied to a virtual machine fault tolerance apparatus of a primary-end host in a virtual machine fault tolerance system, the virtual machine fault tolerance system further includes a secondary-end host, the primary virtual machine runs on the primary-end host, and the secondary virtual machine runs on the secondary-end host. That is, the primary virtual machine runs on the primary-end host in the virtual machine fault tolerance system, and the secondary virtual machine runs on the secondary-end host in the virtual machine fault tolerance system.

Step 302: Receive a network response data packet, where the network response data packet is a primary-end data packet transmitted by the primary virtual machine or a secondary-end data packet transmitted by the secondary virtual machine, the primary-end data packet includes a part or all of the primary-end data, and the secondary-end data packet includes a part or all of the secondary-end data.

Step 303: When peer-end data of the network response data packet is stored, compare data of the network response data packet with the peer-end data according to data byte order, where when the network response data packet is the primary-end data packet, the peer-end data is the secondary-end data, or when the network response data packet is the secondary-end data packet, the peer-end data is the primary-end data.

Step 304: When the compared data is the same, generate and send a newly created data packet to the client, where the newly created data packet includes the compared data.

It can be learned that the virtual machine fault tolerance method used in this embodiment of the present disclosure is applied to a virtual machine fault tolerance apparatus of a primary-end host in a virtual machine fault tolerance system. The virtual machine fault tolerance system further includes a secondary-end host, a primary virtual machine runs on the primary-end host, and a secondary virtual machine runs on the secondary-end host. The method includes receiving a network request sent by a client, and separately sending the network request to the primary virtual machine and the secondary virtual machine such that the primary virtual machine and the secondary virtual machine separately respond to the network request, and generate primary-end data and secondary-end data corresponding to the network request, receiving a network response data packet, where the network response data packet is a primary-end data packet transmitted by the primary virtual machine or a secondary-end data packet transmitted by the secondary virtual machine, the primary-end data packet includes a part or all of the primary-end data, and the secondary-end data packet includes a part or all of the secondary-end data, comparing data of the network response data packet with the peer-end data according to data byte order when peer-end data of the network response data packet is stored, where when the network response data packet is the primary-end data packet, the peer-end data is the secondary-end data, or the peer-end data is the primary-end data when the network response data packet is the secondary-end data packet, and generating and sending a newly created data packet to the client when the compared data is the same, where the newly created data packet includes the compared data. In other approaches, to make byte lengths of network response data packets output by a primary virtual machine and a secondary virtual machine consistent as far as possible, network protocol stacks in kernels of the primary and secondary virtual machines need to be modified. In this way, network performance and computing performance of a virtual machine whose kernel cannot be modified cannot be improved. By comparison, in the virtual machine fault tolerance method provided in this embodiment of the present disclosure, primary-end data can be compared with secondary-end data according to byte order without modifying the network protocol stacks of the primary and secondary virtual machines. Lengths of data packets output by the primary and secondary virtual machines do not need to be consistent, and a newly created data packet can be sent to a client provided that compared data is the same. Therefore, network performance of the primary virtual machine is improved. In addition, when the compared data is the same, a network status of the primary virtual machine does not need to be synchronized to the secondary virtual machine. Therefore, the primary virtual machine does not need to be paused, and computing performance of the primary virtual machine is improved.

Optionally, based on the embodiment corresponding to FIG. 5, in another embodiment of the virtual machine fault tolerance method according to the present disclosure, comparing data of the network response data packet with the peer-end data according to data byte order may include determining, according to the data byte order, to-be-compared data from data whose byte count is larger when a byte count of the data of the network response data packet is different from a byte count of the peer-end data, where the to-be-compared data is data that has a specified byte count and that is in the data whose byte count is larger, and the specified byte count is the same as a byte count of data whose byte count is smaller, and comparing the data whose byte count is smaller with the to-be-compared data according to the data byte order.

In this embodiment of the present disclosure, primary-end data and secondary-end data with a same byte count are determined according to data byte order for comparison, and data content is compared when byte length consistency is ensured. This improves consistency of the primary-end data and the secondary-end data. Therefore, network performance and computing performance of a primary-end host are further improved.

Optionally, based on the embodiment or optional embodiment corresponding to FIG. 5, in another embodiment of the virtual machine fault tolerance method according to the present disclosure, generating and sending a newly created data packet to the client, where the newly created data packet includes the compared data may include marking the compared data using a sequence number of the primary-end data, to generate a newly created data packet, and sending the newly created data packet to the client.

It can be learned that, in this embodiment of the present disclosure, marking the compared data using a sequence number of the primary-end data to generate a newly created data packet, and sending the newly created data packet to the client in a timely manner ensure that a working state of a primary virtual machine is presented when data is output externally. Therefore, network performance of a primary-end host is further improved.

Optionally, based on the embodiment or optional embodiment corresponding to FIG. 5, in another embodiment of the virtual machine fault tolerance method according to the present disclosure, the method may further include placing the data of the network response data packet following the local-end data according to the byte order to obtain combination data when local-end data of the network response data packet is stored, where when the network response data packet is the primary-end data packet, the local-end data is the primary-end data, or the local-end data is the secondary-end data when the network response data packet is the secondary-end data packet, and comparing data of the new network response data packet with the combination data according to the data byte order when a new network response data packet is received, and the combination data is peer-end data of the new network response data packet.

It can be learned that, in this embodiment of the present disclosure, when there is no peer-end data that can be compared, local-end data is sorted in a timely manner in order to avoid data disorder, a data content difference in subsequent comparison, and unnecessary status information synchronization of a primary virtual machine. Therefore, computing performance of the primary virtual machine is further improved. The local-end data is primary-end data when a network response data packet is a primary-end data packet, or the local-end data is secondary-end data when a network response data packet is a secondary-end data packet.

For specific processes of several embodiments of the virtual machine fault tolerance method corresponding to FIG. 5, refer to related description in FIG. 1 to FIG. 4 for understanding, and details are not described herein again.

Figure 6:
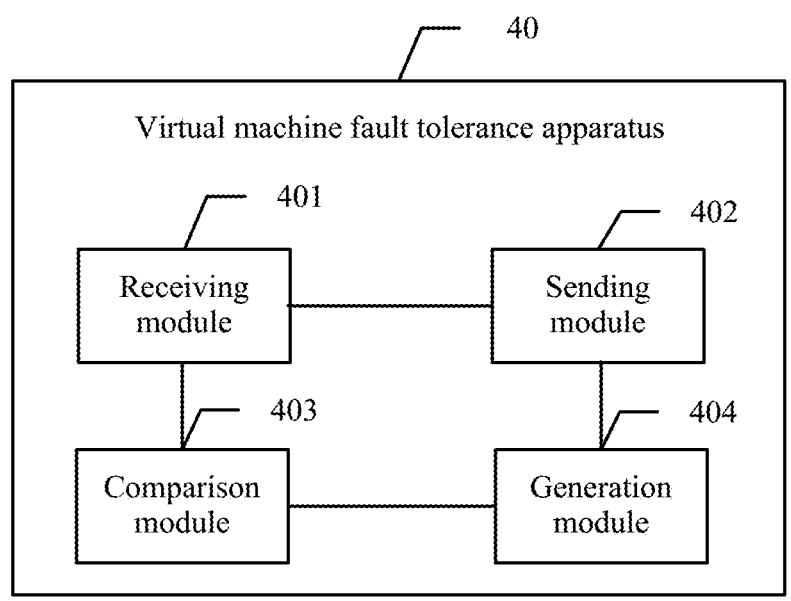
FIG. 6 is a schematic diagram of an embodiment of a virtual machine fault tolerance apparatus according to the present disclosure.

Referring to FIG. 6, a virtual machine fault tolerance apparatus 40 according to the present disclosure is applied to a primary-end host in a virtual machine fault tolerance system, the virtual machine fault tolerance system further includes a secondary-end host, a primary virtual machine runs on the primary-end host, a secondary virtual machine runs on the secondary-end host, and the virtual machine fault tolerance apparatus 40 includes a receiving module 401 configured to receive a network request sent by a client, a sending module 402 configured to separately send the network request received by the receiving module 401 to the primary virtual machine and the secondary virtual machine such that the primary virtual machine and the secondary virtual machine separately respond to the network request, and generate primary-end data and secondary-end data corresponding to the network request, where the receiving module 401 is further configured to receive a network response data packet, where the network response data packet is a primary-end data packet transmitted by the primary virtual machine or a secondary-end data packet transmitted by the secondary virtual machine, the primary-end data packet includes a part or all of the primary-end data, and the secondary-end data packet includes a part or all of the secondary-end data, a comparison module 403 configured to compare data of the network response data packet received by the receiving module 401 with the peer-end data according to data byte order when peer-end data of the network response data packet is stored, where when the network response data packet is the primary-end data packet, the peer-end data is the secondary-end data, or the peer-end data is the primary-end data when the network response data packet is the secondary-end data packet, and a generation module 404 configured to generate a newly created data packet when the comparison module 403 determines by means of comparison that the compared data is the same, where the newly created data packet includes the compared data, where the sending module 402 is further configured to send the newly created data packet generated by the generation module 404 to the client.

It can be learned that, the virtual machine fault tolerance apparatus 40 provided in this embodiment of the present disclosure is applied to a primary-end host in a virtual machine fault tolerance system, the virtual machine fault tolerance system further includes a secondary-end host, a primary virtual machine runs on the primary-end host, a secondary virtual machine runs on the secondary-end host, and the virtual machine fault tolerance apparatus 40 includes a receiving module 401 configured to receive a network request sent by a client, a sending module 402 configured to separately send the network request received by the receiving module 401 to the primary virtual machine and the secondary virtual machine such that the primary virtual machine and the secondary virtual machine separately respond to the network request, and generate primary-end data and secondary-end data corresponding to the network request, where the receiving module 401 is further configured to receive a network response data packet, where the network response data packet is a primary-end data packet transmitted by the primary virtual machine or a secondary-end data packet transmitted by the secondary virtual machine, the primary-end data packet includes a part or all of the primary-end data, and the secondary-end data packet includes a part or all of the secondary-end data, a comparison module 403 configured to compare data of the network response data packet received by the receiving module 401 with the peer-end data according to data byte order when peer-end data of the network response data packet is stored, and a generation module 404 configured to generate a newly created data packet when the comparison module 403 determines by means of comparison that the compared data is the same, where the newly created data packet includes the compared data, where the sending module 402 is further configured to send the newly created data packet generated by the generation module 404 to the client. In other approaches, to make byte lengths of network response data packets output by a primary virtual machine and a secondary virtual machine consistent as far as possible, network protocol stacks in kernels of the primary and secondary virtual machines need to be modified. In this way, network performance and computing performance of a virtual machine whose kernel cannot be modified cannot be improved. By comparison, according to the virtual machine fault tolerance apparatus 40 provided in this embodiment of the present disclosure, primary-end data can be compared with secondary-end data according to byte order without modifying the network protocol stacks of the primary and secondary virtual machines. Lengths of data packets output by the primary and secondary virtual machines do not need to be consistent, and a newly created data packet can be sent to a client provided that compared data is the same. Therefore, network performance of the primary virtual machine is improved. In addition, when the compared data is the same, a network status of the primary virtual machine does not need to be synchronized to the secondary virtual machine. Therefore, the primary virtual machine does not need to be paused, and computing performance of the primary virtual machine is improved.

Figure 7:
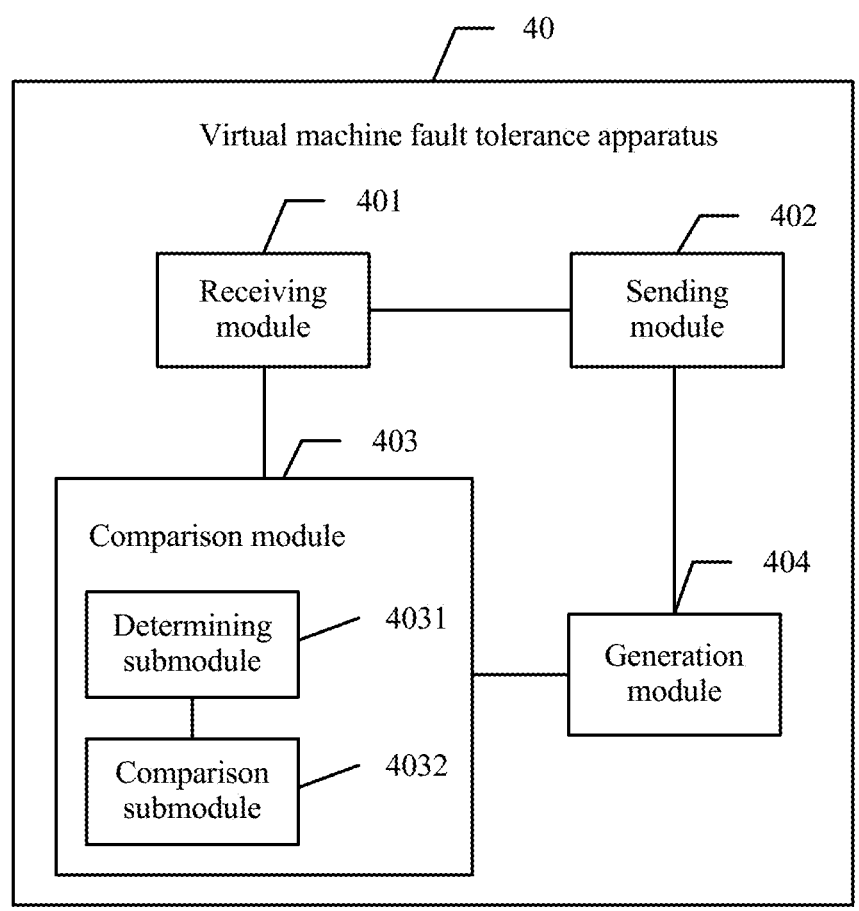
FIG. 7 is a schematic diagram of another embodiment of a virtual machine fault tolerance apparatus according to the present disclosure.

Optionally, based on the embodiment corresponding to FIG. 6, referring to FIG. 7, in another embodiment of the virtual machine fault tolerance apparatus according to the present disclosure, the comparison module 403 includes a determining submodule 4031 configured to determine, according to the data byte order, to-be-compared data from data whose byte count is larger when a byte count of the data of the network response data packet is different from a byte count of the peer-end data, where the to-be-compared data is data that has a specified byte count and that is in the data whose byte count is larger, and the specified byte count is the same as a byte count of data whose byte count is smaller, and a comparison submodule 4032 configured to compare the data whose byte count is smaller with the to-be-compared data according to the data byte order, where the to-be-compared data is determined by the determining submodule 4031.

It can be learned that, in this embodiment of the present disclosure, primary-end data and secondary-end data with a same byte count are extracted according to data byte order for comparison, and data content is compared when byte length consistency is ensured. This improves consistency of the primary-end data and the secondary-end data. Therefore, network performance and computing performance of a primary-end host are further improved.

Optionally, based on the embodiment corresponding to FIG. 6, in another embodiment of the virtual machine fault tolerance apparatus according to the present disclosure, the generation module 404 is further configured to mark the compared data using a sequence number of the primary-end data to generate a newly created data packet, and the sending module 402 is further configured to send the newly created data packet generated by the generation module 404 to the client.

It can be learned that, in this embodiment of the present disclosure, generating the newly created data packet based on the sequence number of the primary-end data, and sending the newly created data packet to the client in a timely manner ensure that a working state of a primary virtual machine is presented when data is output externally. Therefore, network performance of a primary-end host is further improved.

Figure 8:
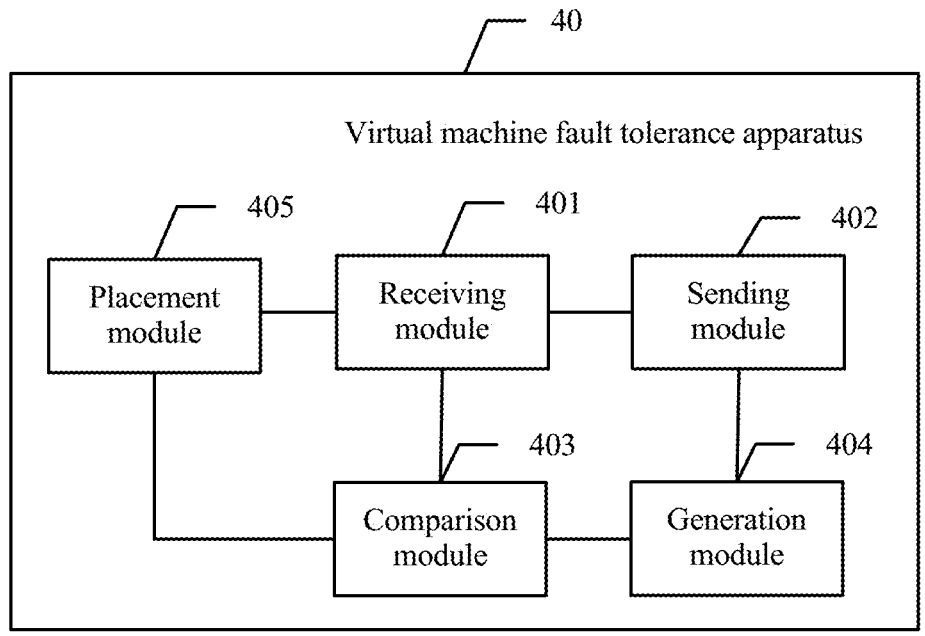
FIG. 8 is a schematic diagram of another embodiment of a virtual machine fault tolerance apparatus according to the present disclosure.

Optionally, based on the embodiment corresponding to FIG. 6, referring to FIG. 8, in another embodiment of the virtual machine fault tolerance apparatus 40 according to the present disclosure, the virtual machine fault tolerance apparatus 40 further includes a placement module 405.

The placement module 405 is configured to place the data of the network response data packet received by the receiving module 401, following the local-end data according to the byte order, to obtain combination data when local-end data of the network response data packet is stored, where when the network response data packet is the primary-end data packet, the local-end data is the primary-end data, or when the network response data packet is the secondary-end data packet, the local-end data is the secondary-end data. The receiving module 401 is further configured to receive a new network response data packet, and the comparison module 403 is further configured to compare data of the new network response data packet with the combination data according to the data byte order when the receiving module 401 receives the new network response data packet, and the combination data obtained by the placement module 405 is peer-end data of the new network response data packet.

It can be learned that, in this embodiment of the present disclosure, when there is no peer-end data that can be compared, local-end data is sorted in a timely manner in order to avoid data disorder, a data content difference in subsequent comparison, and unnecessary status information synchronization of a primary virtual machine. Therefore, computing performance of the primary virtual machine is further improved.

Figure 9:
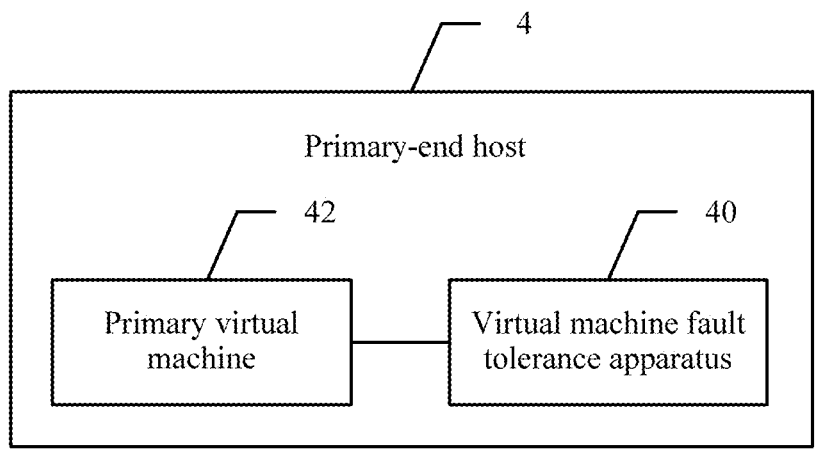
FIG. 9 is a schematic diagram of an embodiment of a primary-end host according to the present disclosure.

Referring to FIG. 9, a primary-end host 4 according to the present disclosure is applied to a virtual machine fault tolerance system, the virtual machine fault tolerance system further includes a secondary-end host, a primary virtual machine 42 runs on the primary-end host 4, a secondary virtual machine runs on the secondary-end host, and the primary-end host 4 further includes a virtual machine fault tolerance apparatus 40, and the virtual machine fault tolerance apparatus 40 is configured to receive a network request sent by a client, and separately send the network request to the primary virtual machine 42 and the secondary virtual machine such that the primary virtual machine 42 and the secondary virtual machine separately respond to the network request, and generate primary-end data and secondary-end data corresponding to the network request, receive a network response data packet, where the network response data packet is a primary-end data packet transmitted by the primary virtual machine 42 or a secondary-end data packet transmitted by the secondary virtual machine, the primary-end data packet includes a part or all of the primary-end data, and the secondary-end data packet includes a part or all of the secondary-end data, compare data of the network response data packet with the peer-end data according to data byte order when peer-end data of the network response data packet is stored, where when the network response data packet is the primary-end data packet, the peer-end data is the secondary-end data, or the peer-end data is the primary-end data when the network response data packet is the secondary-end data packet, and generate and send a newly created data packet to the client when the compared data is the same, where the newly created data packet includes the compared data.

It can be learned that, in other approaches, to make byte lengths of network response data packets output by a primary virtual machine and a secondary virtual machine consistent as far as possible, network protocol stacks in kernels of the primary and secondary virtual machines need to be modified. In this way, network performance and computing performance of a virtual machine whose kernel cannot be modified cannot be improved. By comparison, according to the primary-end host 4 provided in this embodiment of the present disclosure, primary-end data can be compared with secondary-end data according to byte order without modifying the network protocol stacks of the primary and secondary virtual machines. Lengths of data packets output by the primary and secondary virtual machines do not need to be consistent, and a newly created data packet can be sent to a client provided that compared data is the same. Therefore, network performance of the primary virtual machine 42 is improved. In addition, when the compared data is the same, a network status of the primary virtual machine 42 does not need to be synchronized to the secondary virtual machine. Therefore, the primary virtual machine 42 does not need to be paused, and computing performance of the primary virtual machine 42 is improved.

Optionally, the virtual machine fault tolerance apparatus 40 is further configured to determine, according to the data byte order, to-be-compared data from data whose byte count is larger when a byte count of the data of the network response data packet is different from a byte count of the peer-end data, where the to-be-compared data is data that has a specified byte count and that is in the data whose byte count is larger, and the specified byte count is the same as a byte count of data whose byte count is smaller, and compare the data whose byte count is smaller with the to-be-compared data according to the data byte order.

It can be learned that, in this embodiment of the present disclosure, primary-end data and secondary-end data with a same byte count are extracted according to data byte order for comparison, and data content is compared when byte length consistency is ensured. This improves consistency of the primary-end data and the secondary-end data. Therefore, network performance and computing performance of the primary-end host 4 are further improved.

In multiple embodiments of the virtual machine fault tolerance apparatus, it should be understood that, in one implementation manner, the receiving module and the sending module may be implemented by an I/O device (for example, a network adapter), and the comparison module, the determining submodule, the comparison submodule, the generation module, and the placement module may be implemented by a processor to execute a program or an instruction in a storage (that is, may be implemented cooperatively by the processor and a special instruction in a storage coupled to the processor). In another implementation manner, the receiving module, the sending module, the comparison module, the determining submodule, the comparison submodule, the generation module, and the placement module may be separately implemented by a dedicated circuit. For a specific implementation manner, refer to the other approaches, and details are not described herein again. In still another implementation manner, the receiving module, the sending module, the comparison module, the determining submodule, the comparison submodule, the generation module, and the placement module may be implemented by a field programmable gate array (FPGA). For a specific implementation manner, refer to the other approaches, and details are not described herein again. The present disclosure includes but is not limited to the foregoing implementation manners. It should be understood that all solutions implemented according to the idea of the present disclosure shall fall within the protection scope of the embodiments of the present disclosure.

Figure 10:
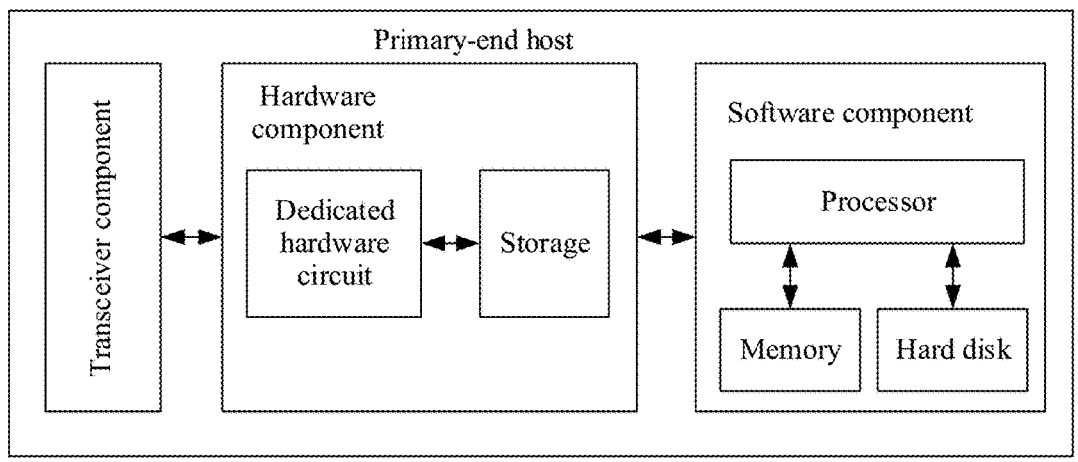
FIG. 10 is a schematic diagram of another embodiment of a primary-end host according to the present disclosure.

An embodiment provides a hardware structure of a primary-end host. Referring to FIG. 10, the hardware structure of the primary-end host may include three parts, a transceiver component, a software component, and a hardware component.

The transceiver component is a hardware circuit configured to complete packet transceiving.

The hardware component may be also referred to as a "hardware processing module," or be simply referred to as "hardware." The hardware component mainly includes a hardware circuit that implements some specific functions based on dedicated hardware circuits such as an FPGA and an application-specific integrated circuit (ASIC) (probably with cooperation from another accessory component such as a storage). A processing speed of the hardware component is usually much faster than that of a general-purpose processor. However, a function of the hardware component is hard to change once the function is customized, and therefore, the hardware component is generally used to process some fixed functions because of inflexible implementation of the hardware component. It should be noted that, in actual application, the hardware component may also include a processor such as a micro control unit (MCU) (such as a single-chip microcomputer) or a CPU. However, main functions of these processors are not to complete processing of big data but to perform some control. In this application scenario, a system including these components is a hardware component.

The software component (or referred to as "software") mainly includes a general-purpose processor (such as a CPU) and some auxiliary components (storage devices such as a memory and a hard disk). The processor may be equipped with a corresponding processing function by means of programming, and when software is used for implementation, flexible configuration may be performed according to a service requirement, but a speed of the software component is usually slower than that of the hardware component. After data is processed by the software, the hardware component may send processed data using the transceiver component, or send processed data to the transceiver component using an interface connected to the transceiver component.

In this embodiment, the transceiver component is configured to receive a network request and send a newly created data packet, compare a network response data packet of the software component or the hardware component with peer-end data, generate a newly created data packet, and the like in the foregoing embodiment.

Another function of the software component and the hardware component is described in detail in the foregoing embodiment, and is not described herein again.

With reference to the accompany drawings, the following describes in detail a technical solution in which the receiving module and the sending module may be implemented by an I/O device (for example, a network adapter), and the comparison module, the determining submodule, the comparison submodule, the generation module, and the placement module may be implemented by a processor to execute a program or an instruction in a storage.

Figure 11:
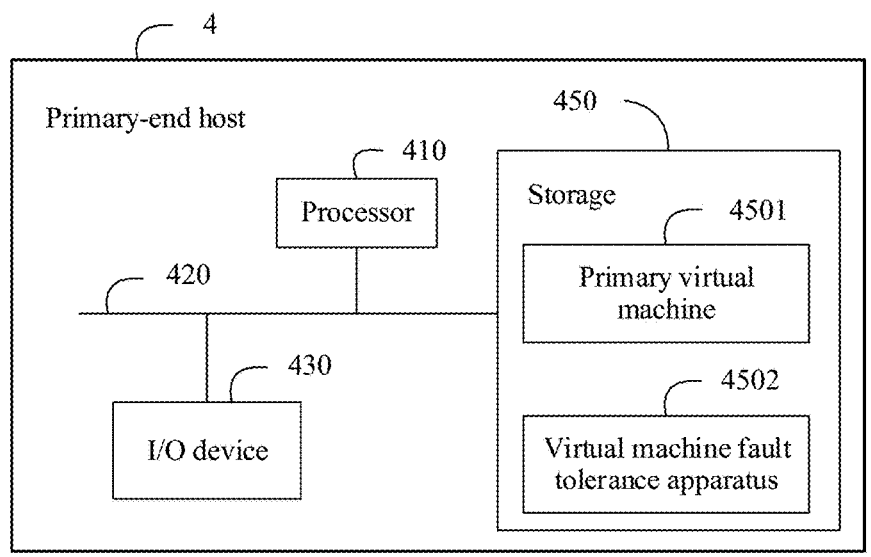
FIG. 11 is a schematic diagram of another embodiment of a primary-end host according to the present disclosure.

FIG. 11 is a schematic structural diagram of a primary-end host 4 according to the present disclosure. The primary-end host 4 is applied to a virtual machine fault tolerance system. The virtual machine fault tolerance system further includes a secondary-end host. The primary-end host 4 includes a processor 410, a storage 450, and an I/O device 430. A primary virtual machine 4501 runs on the storage 450. A secondary virtual machine runs on the secondary-end host. The storage 450 may include a read-only memory (ROM) and a random access memory (RAM), and provide an operation instruction and data to the processor 410. A part of the storage 450 may further include a nonvolatile random access memory (NVRAM).

In some implementation manners, the storage 450 stores the elements such as executable modules or data structures, or their subsets, or their extended sets: a virtual machine, such as primary virtual machine 4501 and a virtual machine fault tolerance apparatus 4502. Using virtual machine software, the primary virtual machine 4501 may simulate one or more virtual computers on one physical computer. These virtual machines can work like real computers, operating systems and application programs can be installed on the virtual machines, and the virtual machines can further visit network resources. For application programs running on the virtual machines, the virtual machines work like real computers. In this embodiment of the present disclosure, by invoking the operation instruction stored in the storage 450 (the operation instruction may be stored in an operating system), the I/O device 430 is configured to receive a network request sent by a client. The processor 410 is configured to separately execute functions of the primary virtual machine 4501 and the secondary virtual machine so as to respond to the network request, generate primary-end data and secondary-end data corresponding to the network request, and separately encapsulate the primary-end data and the secondary-end data into at least one network response data packet, where the network response data packet is a primary-end data packet or a secondary-end data packet, the primary-end data packet includes a part or all of the primary-end data, and the secondary-end data packet includes a part or all of the secondary-end data, compare data of the network response data packet with the peer-end data according to data byte order when peer-end data of the network response data packet is stored, where when the network response data packet is the primary-end data packet, the peer-end data is the secondary-end data, or the peer-end data is the primary-end data when the network response data packet is the secondary-end data packet, and generate a newly created data packet when the compared data is the same, where the newly created data packet includes the compared data, and the I/O device 430 is further configured to send the newly created data packet to the client.

It can be learned that, in other approaches, to make byte lengths of network response data packets output by a primary virtual machine and a secondary virtual machine consistent as far as possible, network protocol stacks in kernels of the primary and secondary virtual machines need to be modified. In this way, network performance and computing performance of a virtual machine whose kernel cannot be modified cannot be improved. By comparison, according to the primary-end host 4 provided in this embodiment of the present disclosure, primary-end data can be compared with secondary-end data according to byte order without modifying the network protocol stacks of the primary and secondary virtual machines. Lengths of data packets output by the primary and secondary virtual machines do not need to be consistent, and a newly created data packet can be sent to a client provided that compared data is the same. Therefore, network performance of the primary virtual machine 4501 is improved. In addition, when the compared data is the same, a network status of the primary virtual machine 4501 does not need to be synchronized to the secondary virtual machine. Therefore, the primary virtual machine 4501 does not need to be paused, and computing performance of the primary virtual machine 4501 is improved.

The processor 410 controls an operation of the primary-end host 4, and the processor 410 may be referred to as a CPU. The storage 450 may include a ROM and a RAM, and provides an instruction and data to the processor 410. A part of the storage 450 may further include a NVRAM. In specific application, all components of the primary-end host 4 are coupled together using a bus system 420. The bus system 420 includes a power bus, a control bus, a status signal bus, and the like in addition to a data bus. However, for clear description, various types of buses in the figure are marked as the bus system 420.

The method disclosed in the foregoing embodiment of the present disclosure may be applied to the processor 410, or implemented by the processor 410. The processor 410 may be an integrated circuit chip and has a signal processing capability. In an implementation process, the steps in the foregoing methods may be completed by means of an integrated logic circuit of hardware in the processor 410 or an instruction in a form of software. The foregoing processor 410 may be a general-purpose processor, a digital signal processor (DSP), an ASIC, an FPGA or another programmable logic component, a discrete gate or a transistor logic component, or a discrete hardware component. Methods, steps, and logical block diagrams disclosed in the embodiments of the present disclosure may be implemented or executed. The general-purpose processor may be a microprocessor or this processor may be any conventional processor, or the like. Steps of the methods disclosed with reference to the embodiments of the present disclosure may be directly executed and completed by means of a hardware decoding processor, or may be executed and completed using a combination of hardware and software modules in a decoding processor. The software module may be located in a mature storage medium in the field, such as a RAM, a flash memory, a ROM, a programmable ROM (PROM), an electrically-erasable PROM (EEPROM), or a register. The storage medium is located in the storage 450. The processor 410 reads information in the storage 450, and completes the steps of the foregoing method in combination with hardware of the processor 410.

Optionally, the processor 410 is further configured to determine, according to the data byte order, to-be-compared data from data whose byte count is larger when a byte count of the data of the network response data packet is different from a byte count of the peer-end data, where the to-be-compared data is data that has a specified byte count and that is in the data whose byte count is larger, and the specified byte count is the same as a byte count of data whose byte count is smaller, and compare the data whose byte count is smaller with the to-be-compared data according to the data byte order.

It can be learned that, in this embodiment of the present disclosure, primary-end data and secondary-end data with a same byte count are extracted according to data byte order for comparison, and data content is compared when byte length consistency is ensured. This improves consistency of the primary-end data and the secondary-end data. Therefore, network performance and computing performance of a primary-end host 4 are further improved.

Optionally, the processor 410 is further configured to mark the compared data using a seq num of the primary-end data to generate a newly created data packet, and the I/O device 430 sends the newly created data packet to the client.

In this embodiment of the present disclosure, the newly created data packet is generated based on a seq num of the primary-end data, and the newly created data packet is sent to the client in a timely manner. Therefore, network performance of the primary-end host 4 is further improved.

Optionally, the processor 410 is further configured to place the data of the network response data packet following the local-end data according to the byte order to obtain combination data when local-end data of the network response data packet is stored, and compare data of a new network response data packet with the combination data according to the data byte order when the new network response data packet is received, and the combination data is peer-end data of the new network response data packet, where when the network response data packet is the primary-end data packet, the local-end data is the primary-end data, or when the network response data packet is the secondary-end data packet, the local-end data is the secondary-end data.

It can be learned that, in this embodiment of the present disclosure, when there is no peer-end data that can be compared, local-end data is sorted in a timely manner in order to avoid data disorder, a data content difference in subsequent comparison, and unnecessary status information synchronization of the primary virtual machine 4501. Therefore, computing performance of the primary virtual machine 4501 is further improved.

Figure 12:
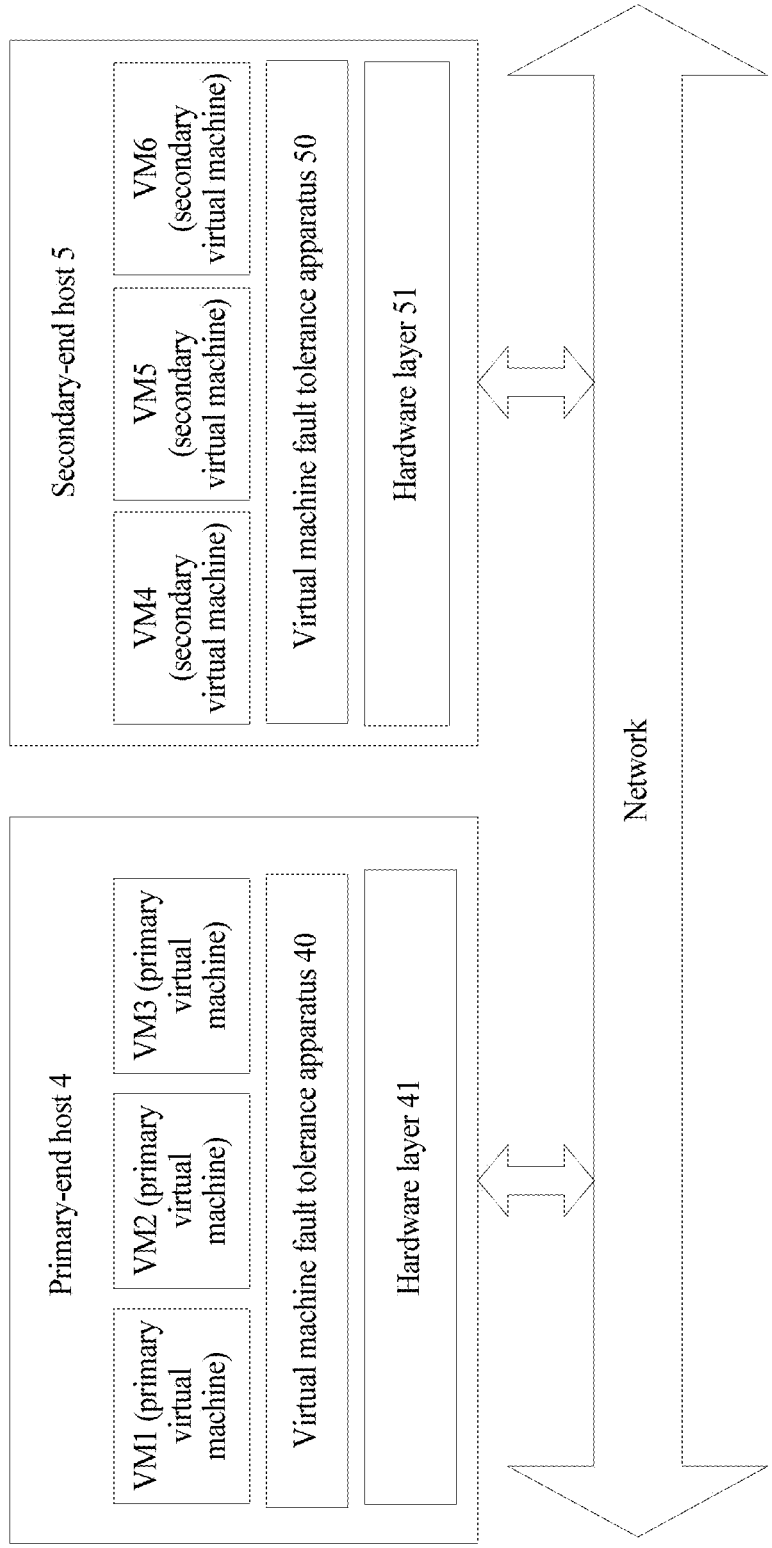
FIG. 12 is a schematic diagram of an embodiment of a virtual machine fault tolerance system according to the present disclosure.

Referring to FIG. 12, an embodiment of a virtual machine fault tolerance system according to the present disclosure includes a primary-end host 4 and a secondary-end host 5. Primary virtual machines, for example, VM1, VM2, and VM3, run on the primary-end host 4. A virtual machine fault tolerance apparatus 40 and a hardware layer 41 run on the primary-end host 4. Secondary virtual machines, for example, VM4, VM5, and VM6, run on the secondary-end host 5. A virtual machine fault tolerance apparatus 50 and a hardware layer 51 run on the secondary-end host 5. When the primary-end host 4 is faulty, after the secondary-end host 5 takes over work of the primary-end host 4, the virtual machine fault tolerance apparatus 50 has a function same as that of the virtual machine fault tolerance apparatus 40.

The primary-end host 4 is configured to receive a network request sent by a client, and separately send the network request to the primary virtual machine and the secondary virtual machine such that the primary virtual machine and the secondary virtual machine separately respond to the network request, and generate primary-end data and secondary-end data corresponding to the network request, receive a network response data packet, where the network response data packet is a primary-end data packet transmitted by the primary virtual machine or a secondary-end data packet transmitted by the secondary virtual machine, the primary-end data packet includes a part or all of the primary-end data, and the secondary-end data packet includes a part or all of the secondary-end data, compare data of the network response data packet with the peer-end data according to data byte order when peer-end data of the network response data packet is stored, where when the network response data packet is the primary-end data packet, the peer-end data is the secondary-end data, or the peer-end data is the primary-end data when the network response data packet is the secondary-end data packet, and generate and send a newly created data packet to the client when the compared data is the same, where the newly created data packet includes the compared data.

It can be learned that, in the other approaches, to make byte lengths of network response data packets output by a primary virtual machine and a secondary virtual machine consistent as far as possible, network protocol stacks in kernels of the primary and secondary virtual machines need to be modified. In this way, network performance and computing performance of a virtual machine whose kernel cannot be modified cannot be improved. By comparison, according to the virtual machine fault tolerance system provided in this embodiment of the present disclosure, primary-end data can be compared with secondary-end data according to byte order without modifying the network protocol stacks of the primary and secondary virtual machines, lengths of data packets output by the primary and secondary virtual machines do not need to be consistent, and a newly created data packet can be sent to a client provided that compared data is the same. Therefore, network performance of the primary virtual machine is improved. In addition, when the compared data is the same, a network status of the primary virtual machine does not need to be synchronized to the secondary virtual machine. Therefore, the primary virtual machine does not need to be paused, and computing performance of the primary virtual machine is improved.

For the primary-end host 4 provided in this embodiment of the present disclosure, refer to the description of the foregoing apparatus embodiments for understanding, and details are not described herein again.

Figure 13:
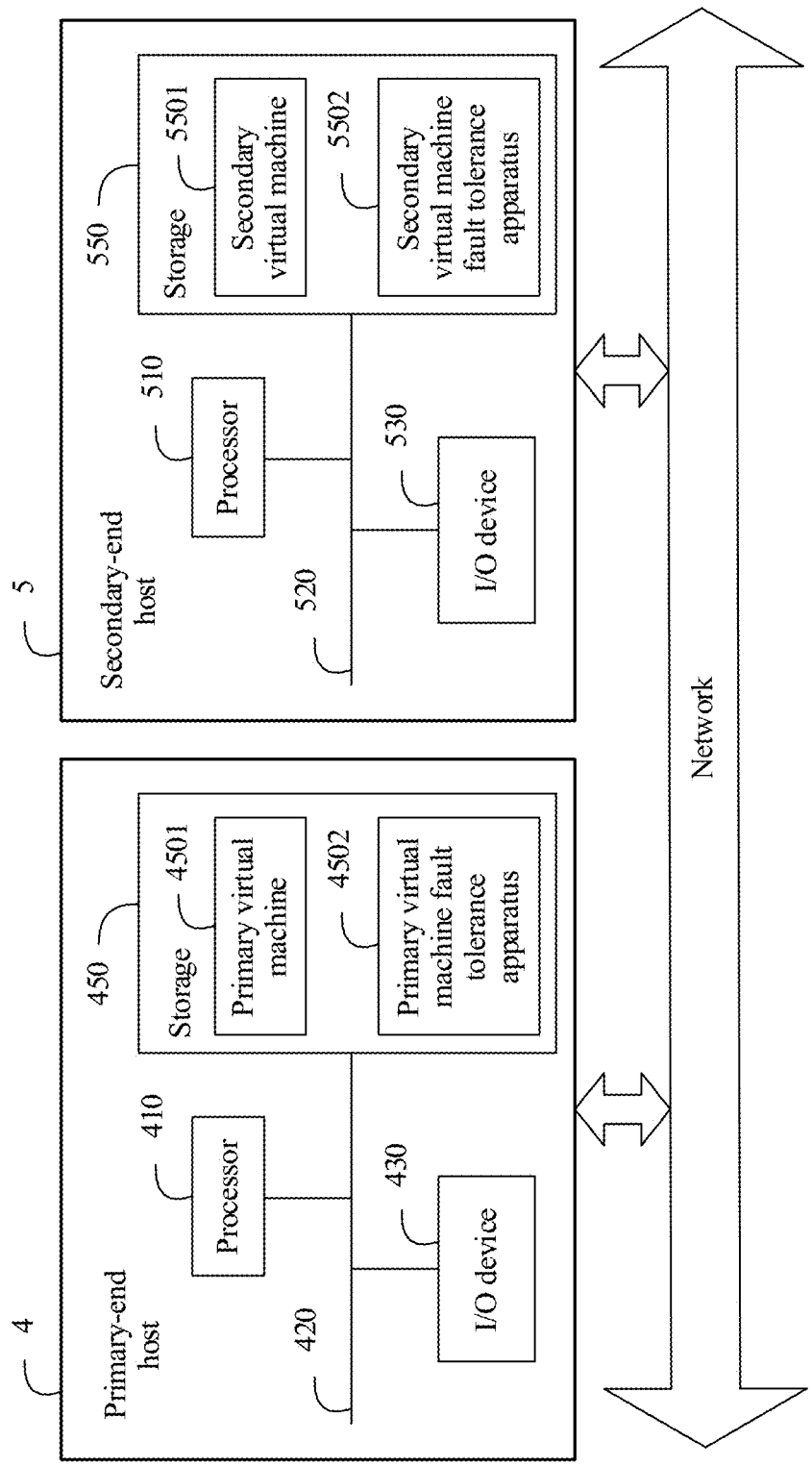
FIG. 13 is a schematic diagram of another embodiment of a virtual machine fault tolerance system according to the present disclosure.

FIG. 13 is an embodiment of a virtual machine fault tolerance system according to the present disclosure.

The virtual machine fault tolerance system includes a primary-end host 4 and a secondary-end host 5. The primary-end host 4 includes a processor 410, a storage 450, and an I/O device 430. The secondary-end host 5 includes a processor 510, a storage 550, and an I/O device 530. A primary virtual machine 4501 and a primary virtual machine fault tolerance apparatus 4502 run on the primary-end host 4. A secondary virtual machine 5501 and a secondary virtual machine fault tolerance apparatus 5502 run on the secondary-end host 5. Further, all components of the primary-end host 4 are coupled together using a bus system 420. Similarly, all components of the secondary-end host 5 are coupled together using a bus system 520. Network data synchronization is performed from the primary-end host 4 to the secondary-end host 5. For a structure of the primary-end host 4, refer to the embodiment corresponding to FIG. 11 for understanding. A hardware structure of the secondary-end host 5 is the same as that of the primary-end host 4.

The primary-end host 4 is configured to receive a network request sent by a client, and separately send the network request to the primary virtual machine 4501 and the secondary virtual machine 5501 such that the primary virtual machine 4501 and the secondary virtual machine 5501 separately respond to the network request, and generate primary-end data and secondary-end data corresponding to the network request, receive a network response data packet, where the network response data packet is a primary-end data packet transmitted by the primary virtual machine 4501 or a secondary-end data packet transmitted by the secondary virtual machine 5501, the primary-end data packet includes a part or all of the primary-end data, and the secondary-end data packet includes a part or all of the secondary-end data, compare data of the network response data packet with the peer-end data according to data byte order when peer-end data of the network response data packet is stored, where when the network response data packet is the primary-end data packet, the peer-end data is the secondary-end data, or the peer-end data is the primary-end data when the network response data packet is the secondary-end data packet, and generate and send a newly created data packet to the client when the compared data is the same, where the newly created data packet includes the compared data.

It can be learned that, in other approaches, to make byte lengths of network response data packets output by a primary virtual machine and a secondary virtual machine consistent as far as possible, network protocol stacks in kernels of the primary and secondary virtual machines need to be modified. In this way, network performance and computing performance of a virtual machine whose kernel cannot be modified cannot be improved. By comparison, according to the virtual machine fault tolerance system provided in this embodiment of the present disclosure, primary-end data can be compared with secondary-end data according to byte order without modifying the network protocol stacks of the primary and secondary virtual machines 4501 and 5501. Lengths of data packets output by the primary and secondary virtual machines 4501 and 5501 do not need to be consistent, and a newly created data packet can be sent to a client provided that compared data is the same. Therefore, network performance of the primary virtual machine 4501 is improved. In addition, when the compared data is the same, a network status of the primary virtual machine 4501 does not need to be synchronized to the secondary virtual machine 5501. Therefore, the primary virtual machine 4501 does not need to be paused, and computing performance of the primary virtual machine 4501 is improved.

For the primary-end host 4 provided in this embodiment of the present disclosure, refer to the description of the foregoing apparatus embodiments for understanding, and details are not described herein again.

Persons of ordinary skill in the art may understand that all or some of the steps of the methods in the embodiments may be implemented by a program instructing relevant hardware (such as a processor). The program may be stored in a computer readable storage medium. The storage medium may include a ROM, a RAM, a magnetic disk, or an optical disc.

The foregoing describes in detail the virtual machine fault tolerance method, apparatus, and system provided in the embodiments of the present disclosure. In this specification, specific examples are used to describe the principle and implementation manners of the present disclosure, and the description of the embodiments is only intended to help understand the method and core idea of the present disclosure. Meanwhile, persons of ordinary skill in the art may, based on the idea of the present disclosure, make modifications with respect to the specific implementation manners and the application scope. Therefore, the content of this specification shall not be construed as a limitation to the present disclosure.

What is claimed is:

1. A virtual machine fault tolerance method applied to a virtual machine fault tolerance apparatus of a primary-end host, wherein the virtual machine fault tolerance method comprises:

receiving a network request from a client;

sending the network request to a primary virtual machine, wherein the primary-end host runs the primary virtual machine;

sending the network request to a secondary virtual machine, wherein a secondary-end host runs the secondary virtual machine;

receiving a plurality of network response data packets, wherein the network response data packets comprises a primary-end data packet received from the primary virtual machine and a secondary-end data packet received from the secondary virtual machine, wherein the primary-end data packet comprises at least a part of the primary-end data, and wherein the secondary-end data packet comprises at least a part of the secondary-end data;

comparing data of a first data packet with peer-end data according to a data byte order and a comparison byte count length, wherein the comparison byte count length is a minimum length of a first byte count length of the first data packet or a second byte count length of the peer-end data, wherein the peer-end data is at least part of the secondary-end data when the first data packet is the primary-end data packet, or wherein the peer-end data is at least part of the primary-end data when the first data packet is the secondary-end data packet; and generating and sending a new data packet to the client when the compared data is the same, wherein the new data packet comprises the compared data.

2. The method of claim 1, wherein comparing the data of the network response data packet with the peer-end data comprises:

determining, according to the data byte order, to-be-compared data from data whose byte count is larger when a byte count of the data of the at least one network response data packet is different from a byte count of the peer-end data, wherein the to-be-compared data has a specified byte count and is in data whose byte count is larger, and wherein the specified byte count is the same as a byte count of data whose byte count is smaller; and comparing the data whose byte count is smaller with the to-be-compared data according to the data byte order.

3. The method of claim 1, wherein generating and sending the new data packet to the client comprises:

marking the compared data using a sequence number of the primary-end data to generate the new data packet; and sending the new data packet to the client.

4. The method of claim 1, further comprising:

placing the data of the at least one network response data packet following a local-end data according to the byte order to obtain combination data when the local-end data of the at least one network response data packet is stored, wherein the local-end data is the primary-end data when the at least one network response data packet is the primary-end data packet, and wherein the local-end data is the secondary-end data when the at least one network response data packet is the secondary-end data packet; and comparing data of a new network response data packet with the combination data according to the data byte order when the new network response data packet is received, wherein the combination data is peer-end data of the new network response data packet.

5. A primary-end host comprising:

a non-transitory memory comprising instructions; and a hardware processor coupled to the memory, wherein the instructions cause the hardware processor to be configured to:

receive a network request from a client;

send the network request to a primary virtual machine, wherein the primary-end host runs the primary virtual machine;

send the network request to a secondary virtual machine, wherein a secondary-end host runs the secondary virtual machine;

receive a plurality of network response data packets comprising a primary-end data packet received from the primary virtual machine and a secondary-end data packet received from the secondary virtual machine, wherein the primary-end data packet comprises at least a part of the primary-end data, and wherein the secondary-end data packet comprises at least a part of the secondary-end data;

compare data of a first data packet with peer-end data according to a data byte order and a comparison byte count length, wherein the comparison byte count length is a minimum length of a first byte count length of the first data packet or a second byte count length of the peer-end data, wherein the peer-end data is at least part of the secondary-end data when the first data packet is the primary-end data packet, or wherein the peer-end data is at least part of the primary-end data when the first data packet is the secondary-end data packet;

generate a new data packet when the compared data is the same, wherein the new data packet comprises the compared data; and send the new data packet to the client.

6. The primary-end host of claim 5, wherein the instructions further cause the hardware processor to be configured to:

determine, according to the data byte order, to-be-compared data from data whose byte count is larger when a byte count of the data of the at least one network response data packet is different from a byte count of the peer-end data, wherein the to-be-compared data has a specified byte count and is in data whose byte count is larger, and wherein the specified byte count is the same as a byte count of data whose byte count is smaller; and compare the data whose byte count is smaller with the to-be-compared data according to the data byte order.

7. The primary-end host of claim 5, wherein the instructions further cause the hardware processor to be configured to:

mark the compared data using a sequence number of the primary-end data to generate the new data packet; and send the new data packet to the client.

8. The primary-end host of claim 5, wherein the instructions further cause the hardware processor to be configured to:

place the data of the at least one network response data packet following local-end data of the at least one network response data packet according to the byte order to obtain combination data when the local-end data is stored, wherein the local-end data is the primary-end data when the at least one network response data packet is the primary-end data packet, and wherein the local-end data is the secondary-end data when the at least one network response data packet is the secondary-end data packet;

receive a new network response data packet; and compare data of the new network response data packet with the combination data according to the data byte order when receiving the new network response data packet, and wherein the combination data is peer-end data of the new network response data packet.

9. A virtual machine fault tolerance system, comprising:
a primary-end host comprising a primary virtual machine; and
a secondary-end host comprising a secondary virtual machine, wherein the primary-end host is configured to:
  receive a network request from a client;
  send the network request to the primary virtual machine;
  send the network request to the secondary virtual machine;
  receive a plurality of network response data packets, the network response data packet comprising a primary-end data packet received from the primary virtual machine and a secondary-end data packet received from the secondary virtual machine, wherein the primary-end data packet comprises at least a part of the primary-end data, and wherein the secondary-end data packet comprises at least a part of the secondary-end data;
  compare data of a first data packet with peer-end data according to a data byte order and a comparison byte count length, wherein the comparison byte count length is a minimum length of a first byte count length of the first data packet or a second byte count length of the peer-end data wherein the peer-end data is at least part of the secondary-end data when the first data packet is the primary-end data packet, or wherein the peer-end data is at least part of the primary-end data when first data packet is the secondary-end data packet;
  generate a new data packet when the compared data is the same, wherein the new data packet comprises the compared data; and
  send the new data packet to the client.

10. The virtual machine fault tolerance system of claim 9, wherein the instructions further cause the hardware processor to be configured to:
  determine, according to the data byte order, to-be-compared data from data whose byte count is larger when a byte count of the data of the at least one network response data packet is different from a byte count of the peer-end data, wherein the to-be-compared data has a specified byte count and is in data whose byte count is larger, and wherein the specified byte count is the same as a byte count of data whose byte count is smaller; and
  compare the data whose byte count is smaller with the to-be-compared data according to the data byte order.

11. The virtual machine fault tolerance system of claim 9, wherein the instructions further cause the hardware processor to be configured to:
  mark the compared data using a sequence number of the primary-end data to generate the new data packet; and
  send the new data packet to the client.

12. The virtual machine fault tolerance system of claim 9, wherein the instructions further cause the hardware processor to be configured to:
  place the data of the at least one network response data packet following local-end data of the network response data packet according to the byte order to obtain combination data when the local-end data is stored, wherein the local-end data is the primary-end data when the network response data packet is the primary-end data packet, and wherein the local-end data is the secondary-end data when the at least one network response data packet is the secondary-end data packet;
  receive a new network response data packet; and
  compare data of the new network response data packet with the combination data according to the data byte order when receiving the new network response data packet, and wherein the combination data is peer-end data of the new network response data packet.

13. A non-transitory computer-readable storage medium comprising instructions which, when executed by a computer comprising a hardware processor coupled to the non-transitory computer-readable medium, cause the computer to be configured to:
  receive a network request from a client;
  send the network request to a primary virtual machine, wherein a primary-end host runs the primary virtual machine;
  send the network request to a secondary virtual machine, wherein a secondary-end host runs the secondary virtual machine;
  receive a plurality of network response data packets, the network response data packets comprising a primary-end data packet received from the primary virtual machine and a secondary-end data packet received from the secondary virtual machine, wherein the primary-end data packet comprises at least a part of the primary-end data, and wherein the secondary-end data packet comprises at least a part of the secondary-end data;
  compare data of a first data packet with peer-end data according to a data byte order and a comparison byte count length, wherein the comparison byte count length is a minimum length of a first byte count length of the first data packet or a second byte count length of the peer-end data wherein the peer-end data is at least part of the secondary-end data when the first data packet is the primary-end data packet, or wherein the peer-end data is at least part of the primary-end data when the first data packet is the secondary-end data packet; and
  generate and send a new data packet to the client when the compared data is the same, wherein the new data packet comprises the compared data.

14. The non-transitory computer-readable storage medium of claim 13, wherein the instructions further cause the computer to be configured to:
  determine, according to the data byte order, to-be-compared data from data whose byte count is larger when a byte count of the data of the at least one network response data packet is different from a byte count of the peer-end data, wherein the to-be-compared data has a specified byte count and is in data whose byte count is larger, and wherein the specified byte count is the same as a byte count of data whose byte count is smaller; and
  compare the data whose byte count is smaller with the to-be-compared data according to the data byte order.

15. The non-transitory computer-readable storage medium of claim 13, wherein the instructions further cause the computer to be configured to:
  mark the compared data using a sequence number of the primary-end data to generate the new data packet; and
  the new data packet to the client.

16. The non-transitory computer-readable storage medium of claim 13, wherein the instructions further cause the computer to be configured to:

place the data of the at least one network response data packet following a local-end data according to the byte order to obtain combination data when the local-end data of the network response data packet is stored, wherein the local-end data is the primary-end data when the at least one network response data packet is the primary-end data packet, and wherein the local-end data is the secondary-end data when the at least one network response data packet is the secondary-end data packet; and compare data of a new network response data packet with the combination data according to the data byte order when the new network response data packet is received, wherein the combination data is peer-end data of the new network response data packet.

* * * * *